US010975790B2

(12) United States Patent
Kurtz et al.

(10) Patent No.: US 10,975,790 B2
(45) Date of Patent: Apr. 13, 2021

(54) SYSTEMS AND METHODS FOR CONTROLLING BOOST DURING AN ENGINE COLD START

(71) Applicant: Ford Global Technologies, LLC, Dearborn, MI (US)

(72) Inventors: Eric Matthew Kurtz, Dearborn, MI (US); Jason Brian Martz, Canton, MI (US); Satheesh Makkapati, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 16/551,606

(22) Filed: Aug. 26, 2019

(65) Prior Publication Data

US 2021/0062776 A1 Mar. 4, 2021

(51) Int. Cl.
| | | |
|---|---|---|
| *F02D 41/06* | (2006.01) | |
| *F02N 11/08* | (2006.01) | |
| *F02D 41/00* | (2006.01) | |
| *F02B 39/10* | (2006.01) | |

(52) U.S. Cl.
CPC .......... *F02D 41/064* (2013.01); *F02B 39/10* (2013.01); *F02D 41/0007* (2013.01); *F02N 11/0862* (2013.01); *F02N 2200/022* (2013.01); *F02N 2200/061* (2013.01)

(58) Field of Classification Search
CPC ...... F02B 39/10; F02D 23/00; F02D 41/0007; F02D 41/06; F02D 41/062; F02D 41/064; F02N 11/0862; F02N 2200/022; F02N 2200/061

USPC ........................................................ 701/113
See application file for complete search history.

(56) References Cited

U.S. PATENT DOCUMENTS

| | | | |
|---|---|---|---|
| 6,657,315 B1 | 12/2003 | Peters et al. | |
| 6,684,863 B2 * | 2/2004 | Dixon .............. | F02M 35/10163 123/565 |
| 6,829,888 B2 | 12/2004 | Kuenstler et al. | |
| 7,007,460 B2 | 3/2006 | Frieden et al. | |
| 8,301,358 B2 * | 10/2012 | Kurtz .................... | F02P 19/021 701/105 |

(Continued)

FOREIGN PATENT DOCUMENTS

DE   102018110512 A1 * 9/2018 ............. F01N 9/002

*Primary Examiner* — Erick R Solis
*Assistant Examiner* — Robert A Werner
(74) *Attorney, Agent, or Firm* — Geoffrey Brumbaugh; McCoy Russell LLP

(57) ABSTRACT

Systems and methods are provided for using an electric machine as a generator to control boost during an engine cold start. In one example, a method may include receiving a request to increase an engine load during the engine cold start, determining an available capacity of a battery, operating the electric machine as a generator to increase the engine load with an electrical load, and responsive to the available capacity of the battery being less than a charge threshold, charging the battery with the electrical load while generating an increased boost pressure with an electric boosting device by powering the electric boosting device via the battery, and coordinating an amount of the increased boost pressure to compensate the electrical load. By increasing the engine load during the engine cold start, an exhaust gas temperature may be increased to achieve catalyst light-off.

20 Claims, 8 Drawing Sheets

(56) References Cited

U.S. PATENT DOCUMENTS

| | | | |
|---|---|---|---|
| 10,156,211 B1* | 12/2018 | Martin | F02D 41/029 |
| 2017/0045004 A1 | 2/2017 | Naidu et al. | |
| 2017/0328272 A1* | 11/2017 | Yamashita | F02B 39/10 |
| 2019/0032585 A1* | 1/2019 | Kelly | F02B 39/10 |
| 2020/0378321 A1* | 12/2020 | Echigo | F02D 41/0007 |

* cited by examiner

SYSTEMS AND METHODS FOR CONTROLLING BOOST DURING AN ENGINE COLD START

FIELD

The present description relates generally to systems and methods for operating an electric machine in a vehicle, specifically for using the electric machine as a generator to control boost during an engine cold start.

BACKGROUND/SUMMARY

Diesel engines may provide high torque and increased fuel economy as compared to gasoline engines. However, the temperature of diesel exhaust gases is lower than that of many gasoline engines. Therefore, it may take longer for a catalyst in an exhaust system of the diesel engine to reach a temperature threshold where high catalyst efficiency is achieved (e.g., a catalyst light-off temperature) after an engine cold start. Further, many diesel engines are turbocharged to increase engine output, and exhaust gas heat is extracted by the turbocharger. Consequently, even less exhaust gas heat may be available to light off the catalyst. As a result of prolonging an amount of time before the catalyst reaches its light-off temperature, in some examples vehicle emissions may be increased.

Other attempts to address expediting catalyst light-off in diesel engine systems include increasing a load of the engine during the cold start. One example approach is shown by Peters et al. in U.S. Pat. No. 6,657,315. Therein, an electric motor/generator is used to generate a negative torque during cold start conditions in order to increase the load on the engine. The increased load increases exhaust mass flow and heat, thereby reducing a light-off time of a catalytic converter.

However, the inventors herein have recognized potential issues with such systems. As one example, a system battery may be unable to accept additional charge when its state of charge (SOC) is greater than a threshold amount (e.g., the system battery is fully charged). Therefore, the SOC of the system battery at engine start may not enable the prolonged charging that may occur when using the electric motor/generator to increase the engine load and thereby achieve catalyst light-off.

Accordingly, the inventors herein have provided systems and methods to at least partly address the above issues. One example includes a method including receiving a request to increase an engine load during an engine cold start, determining an available capacity of a battery, operating an electric machine as a generator to increase the engine load with an electrical load, and responsive to the available capacity of the battery being less than a charge threshold, charging the battery with the first electrical load while generating an increased boost pressure with an electric boosting device (e.g., turbocharger) by powering the electric boosting device via the battery, and coordinating the an amount of the increased boost pressure to compensate the electrical load. In this way, the electric machine may be used to increase the load on the engine to expedite catalyst heating during an engine cold start even when the battery is fully charged.

In one example, a target boost pressure may be determined based on an electrical load to be consumed by the electric boosting device. However, in some examples, the electric boosting device may generate a boost pressure different from the target boost pressure. Thus, one or more of an intake throttle and a bypass valve of a turbine of the electric boosting device may be adjusted to match the boost pressure to the target boost pressure. In additional or alternative examples wherein the turbine is a variable nozzle turbine (VNT), an aspect ratio of the VNT may be adjusted. In this way, the electric boosting device may consume charge from the battery to generate boost pressure in a controlled manner, thereby helping to maintain emissions during the engine load increase. In some examples, excess boost pressure may be used to retard ignition timing, improving fuel economy and thereby reducing emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
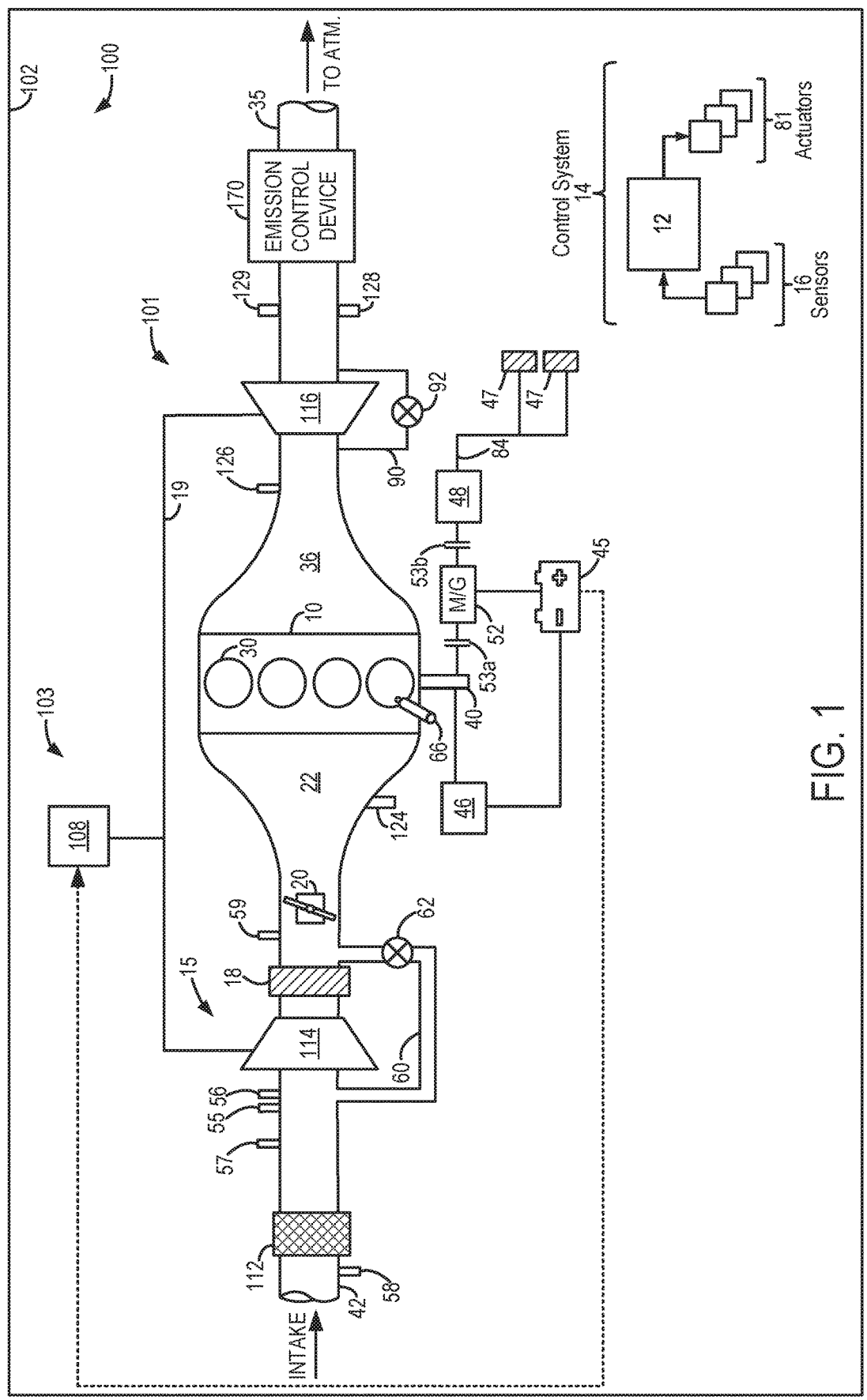
FIG. 1 shows a schematic diagram of an example embodiment of a vehicle with a boosted engine system configured with electric assistance.
Figure 2:
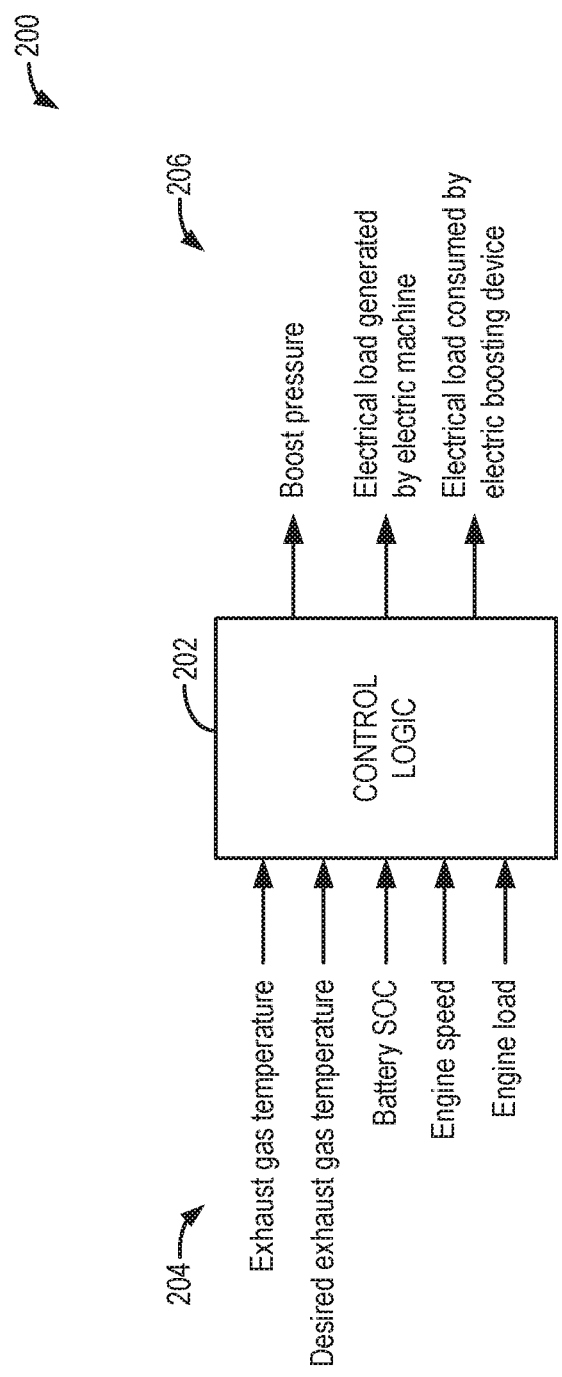
FIG. 2 shows a high-level input-output diagram for a vehicle controller operable to adjust an engine load during an engine cold start.
Figure 5:
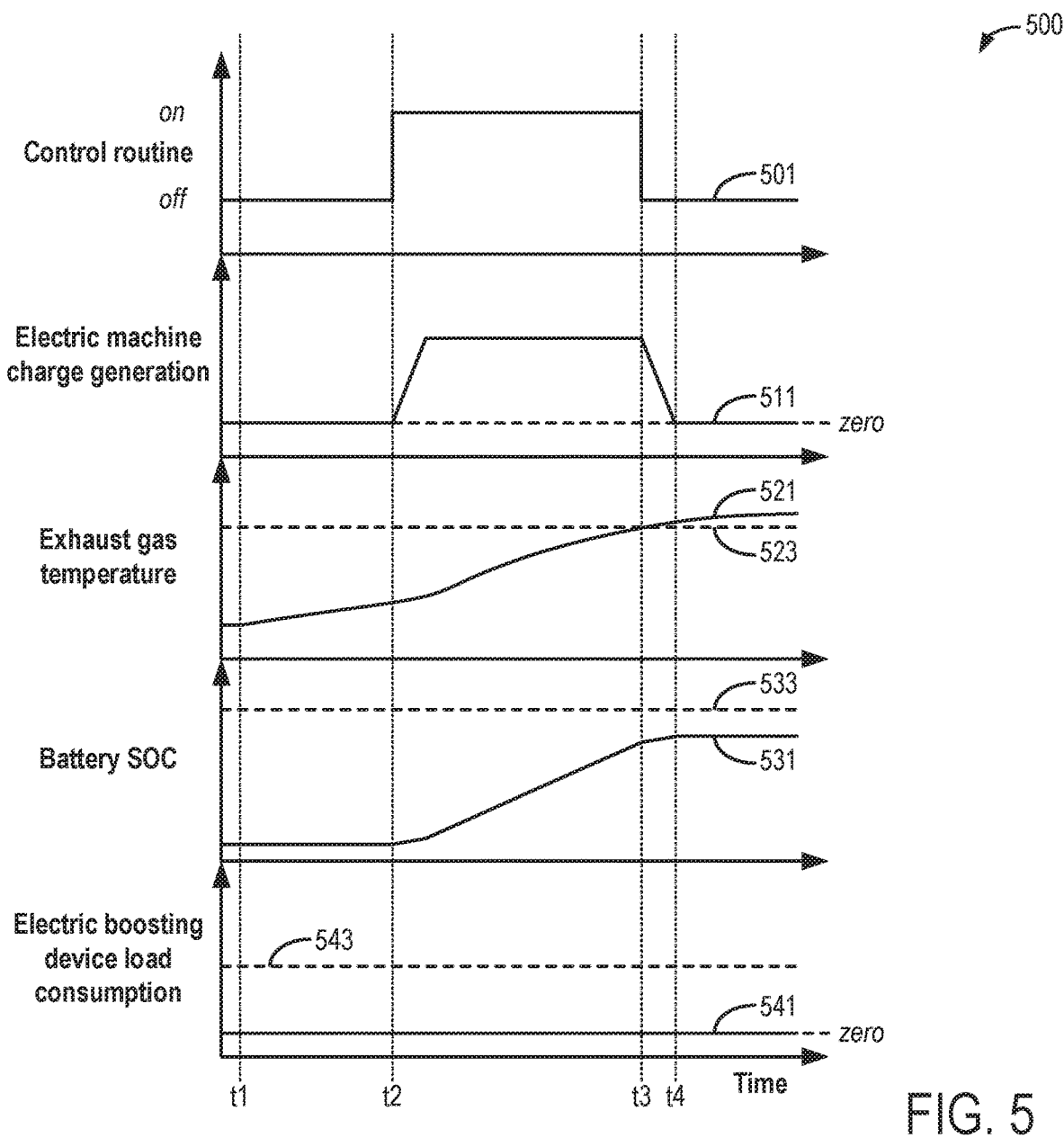
FIG. 5 shows a prophetic example of adjusting a first operation of the electric machine and the electric boosting device during the engine cold start.
Figure 6:
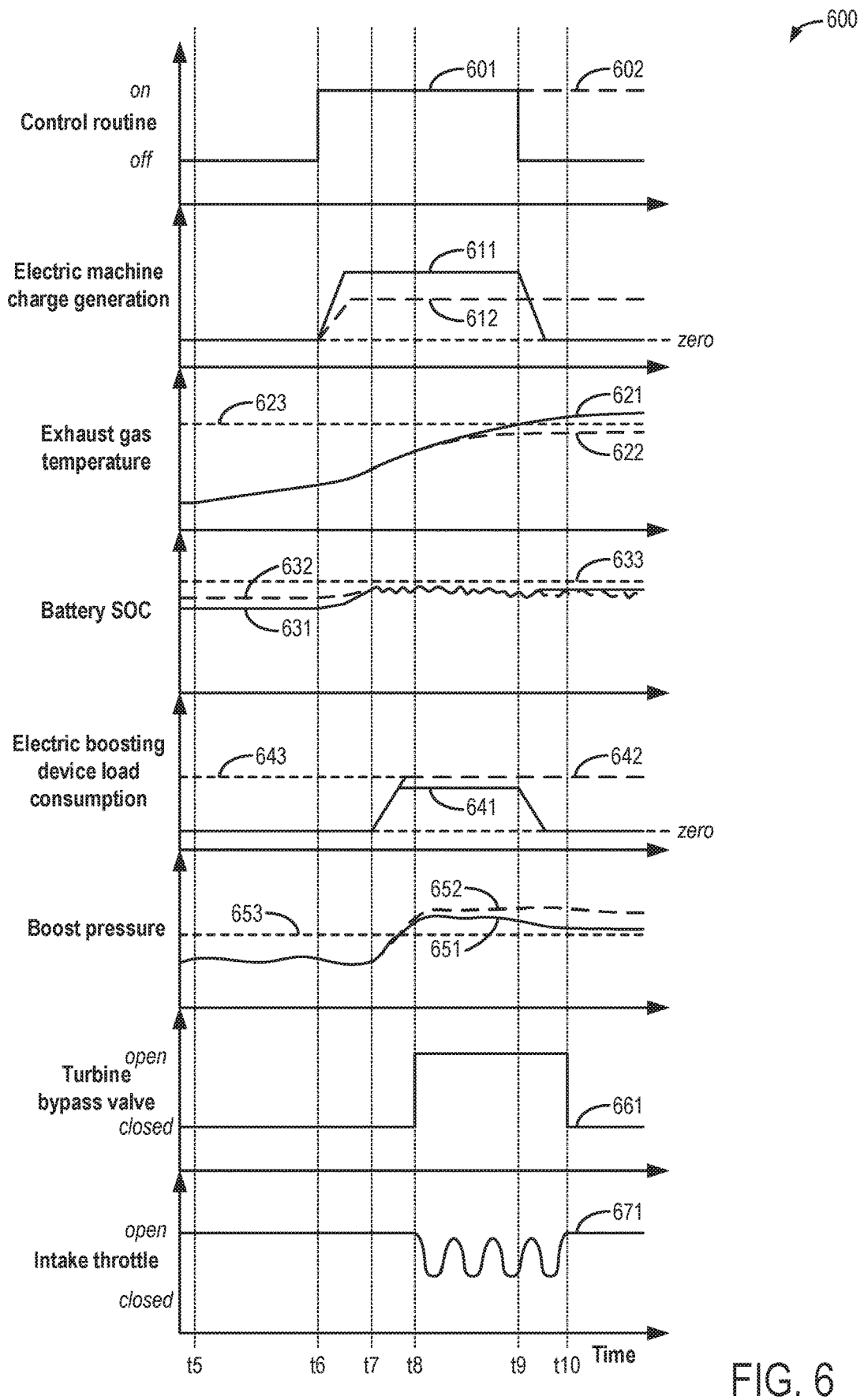
FIG. 6 shows a prophetic example of adjusting second and third operations of the electric machine and the electric boosting device during the engine cold start.
Figure 7:
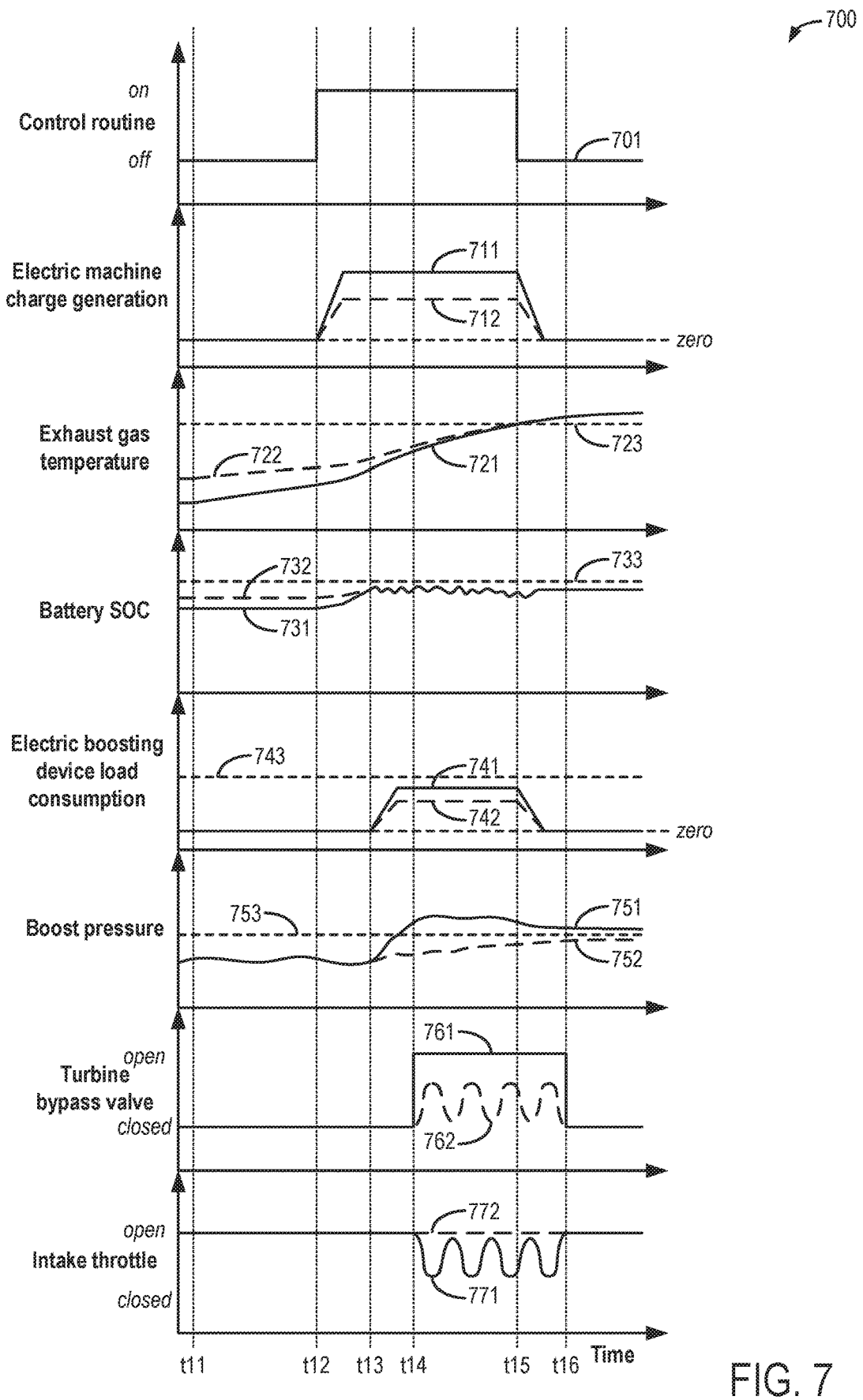
FIG. 7 shows a prophetic example of adjusting fourth and fifth operations of the electric machine and the electric boosting device during the engine cold start.

The following description relates to systems and methods for using an electric machine as a generator in a boosted engine system to adjust an engine load, such as in the engine system of FIG. 1. A controller may be configured to perform a control routine to adjust the engine load, whereby one or more received inputs may be processed to generate one or more outputs, as shown at FIG. 2. For example, the control routine may be the method depicted at FIGS. 3A and 3B for operating the electric machine as a generator during an engine cold start to adjust the engine load. Therein, the control routine may look up a maximum compressor pressure ratio based on a target mass air flow for an electric boosting device, such as by using the map depicted at FIG. 4. Prophetic examples showing coordinated operation of the electric machine and the electric boosting device during the engine cold start are shown at FIGS. 5-7.

Referring now to FIG. 1, aspects of an example hybrid vehicle system 100 are depicted schematically, including an engine system 101 having an engine 10 coupled in a vehicle 102. In the depicted example, vehicle 102 is a hybrid electric vehicle with multiple sources of torque available to one or more vehicle wheels 47. In the example shown, a powertrain of vehicle 102 includes engine 10 and an electric machine 52. Electric machine 52 may be a motor or a motor/generator. Engine 10 and electric machine 52 are connected to vehicle wheels 47 via a transmission 48 when one or more clutches are engaged. In the depicted example, a first clutch 53a is provided between engine 10 and electric machine 52, and a second clutch 53b is provided between electric machine 52 and transmission 48. A controller 12 may send a signal to an actuator of each clutch to engage or disengage the given clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53a, 53b are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53a (e.g., an amount of clutch slippage), an amount of engine torque relayed to the wheels 47 via powertrain shaft 84 may be modulated.

Electric machine 52 may be an HEV motor coupled in the drivetrain between the engine 10 and the transmission 48. In other examples, electric machine 52 may be a crankshaft integrated starter/generator (CISG). The CISG may be coupled to an output shaft of the engine 10 so that during a startup of the hybrid vehicle system 100, the CISG may provide torque to turn the engine 10 and thereby facilitate startup of the engine 10. Under some conditions, the CISG may supply torque output to supplement or replace engine torque. Further, the CISG may supply negative torque output (that is, absorb driveline torque) that may be converted into electric energy, such as for charging a system electrical energy storage device 45, or system battery 45. It will be appreciated that while the system electrical energy storage device 45 is depicted herein as a battery, in other examples, the system electrical energy storage device 45 may be a capacitor.

The powertrain may be configured in various manners, including as a parallel, a series, or a series-parallel hybrid vehicle. In electric vehicle embodiments, a system electrical energy device, such as system battery 45 may be coupled to the driveline. System battery 45 may be a traction battery that delivers electrical power to electric machine 52 to provide torque to vehicle wheels 47.

In some embodiments, electric machine 52 may also be operated as a generator to provide electrical power to charge system battery 45, for example, during a braking operation. In other embodiments, electric machine 52 may be operated as a generator during an engine cold start (e.g., when one or more engine operating conditions indicate the engine cold start). During such an event, one or more exhaust after-treatment components included in an emission control device 170 (described in further detail below) may not yet be sufficiently heated to achieve light-off. To speed up this light-off, an intake mass air flow may be increased, which correspondingly increases engine load and thereby exhaust gas temperature. The increased engine load may be mechanically transferred to electric machine 52 to power electric machine 52 as a generator. A resulting electric load, or current, generated by electric machine 52 may then be used to charge system battery 45.

System battery 45 may discharge at least a portion of a charge stored therein to electric motor 108 to power an electric boosting device 103. In some embodiments, system battery 45 may be charged to, or near, 100% state of charge (SOC). In such embodiments, system battery 45 may not be able to accept an electrical load from, for example, electric machine 52. A control routine, such as the example control routine described below with reference to FIGS. 3A and 3B, may be implemented in controller 12, which may be included in a control system 14, to determine when the SOC of system battery 45 is greater than a charge threshold during an engine cold start. When the SOC is less than the charge threshold, electric machine 52 may be used to increase the engine load. For example, controller 12 may request increased engine torque to overcome braking torque of electric machine 52, resulting in increased mass air flow through engine 10 and electric charge generation. The increased mass air flow may expedite light-off of one or more exhaust after-treatment components of emission control device 170, while the generated electric charge may be stored at system battery 45. In contrast, when the SOC is greater than the charge threshold, system battery 45 may be unable to accept additional charge from electric machine 52 and may instead pass at least a portion of the electrical load (minus efficiency losses) to electric motor 108 to power electric boosting device 103. For example, electric boosting device 103 may consume an electric load proportionate to the electrical load generated by operating electric machine 52 to provide (negative) braking torque on engine 10. In this way, an electric machine in a hybrid electric vehicle system may be operated as a generator to accept an increased engine load and thereby facilitate engine and catalyst warm-up.

It will be appreciated that in other embodiments, including non-electric vehicle embodiments, system battery 45 may be a typical starting, lighting, ignition (SLI) battery coupled to an alternator 46. Alternator 46 may be configured to charge system battery 45 using engine torque drawn from crankshaft 40 during engine running. In addition, alternator 46 may power one or more electrical systems of engine 10, such as one or more auxiliary systems including a heating, ventilation, and air conditioning (HVAC) system, vehicle lights, an on-board entertainment system, and other auxiliary systems based on their corresponding electrical demands. In one example, a current drawn on alternator 46 may continually vary based on each of an operator cabin cooling demand, a battery charging requirement, other auxiliary vehicle system demands, and motor torque. A voltage regulator may be coupled to alternator 46 in order to regulate the power output of alternator 46 based upon system usage requirements, including auxiliary system demands. As elaborated herein, during conditions when alternator 46 is degraded, battery charging may be enabled via one or more of electric machine 52 and electric assist motor 108.

In the depicted embodiment, engine 10 is a boosted engine configured with turbocharger 15. Turbocharger 15 includes compressor 114 that is mechanically coupled to, and driven by, turbine 116 via a turbocharger shaft 19, the turbine 116 driven by expanding engine exhaust. In one embodiment, turbocharger 15 may be a twin scroll device. In another embodiment, turbocharger 15 may be a variable geometry turbocharger (VGT), or variable nozzle turbine (VNT), wherein turbine geometry is actively varied as a function of engine operating conditions.

Turbocharger 15 may be further configured as electric boosting device 103 having an electric motor 108 (herein also referred to as electric assist motor 108 or electric boost assist motor 108) configured to provide electric assistance to compressor 114, turbine 116, or turbocharger shaft 19. In the depicted example, electric motor 108 is coupled to turbocharger shaft 19, although, in other examples, electric motor 108 may be selectively coupled to compressor 114 or turbine 116. Electric motor 108 may be powered by an on-board energy storage device, such as system battery 45. Electric motor 108 may be additionally or alternatively powered by alternator 46.

Electric motor 108 may be configured as a motor-generator. Thus, during conditions when electric assistance is required for boost build-up, electric motor 108 may provide positive torque to drive a centrifugal compressor of turbocharger shaft 19 to increase a transient boost pressure delivery. However, electric motor 108 may also be capable of energy recuperation by "braking" turbocharger shaft 19. Therein, negative torque may be applied to compressor 114 (or to turbocharger shaft 19), reducing a compressor speed and concurrently charging system battery 45 coupled to electric motor 108. An amount of electrical power delivered to electric motor 108 may be varied in order to adjust an output of electric boosting device 103. In one example, an amount of electric power delivered to electric motor 108 may be increased to provide positive torque to turbocharger shaft 19 to increase a speed of compressor 114. As a result of such electrical assistance, compressor 114 of electric boosting device 103 may be rapidly spun up, reducing turbo lag. In another example, an amount of electric power may be generated by electric motor 108 acting as a generator to provide negative torque to turbocharger shaft 19 to decrease the speed of compressor 114. As a result of such regenerative action, turbine 116 may be rapidly spun down, reducing overboost.

Fresh air is introduced along intake passage 42 into engine 10 via air box 112 and flows to compressor 114. Air is then compressed at compressor 114 and introduced into engine 10. Air compressed by turbocharger 15 may also be recirculated from an outlet to an inlet of compressor 114 through a compressor recirculation passage 60 by adjusting an opening of a compressor recirculation valve (CRV) 62. CRV 62 may be a continuously variable valve, or possibly a variable discrete valve, and increasing an opening of the CRV 62 may include actuating (or energizing) a solenoid of CRV 62 if discrete, or a motor controller such as an H bridge if continuous.

Compressor 114 is coupled to a throttle valve 20 (also referred to as an intake throttle 20 herein) through a charge-air cooler (CAC) 18 (also referred to as an intercooler 18 herein). Air flows from compressor 114 through CAC 18 and throttle valve 20 to an intake manifold 22. CAC 18 may be an air-to-air or water-to-air heat exchanger, for example. Intake manifold pressure (e.g., a pressure of an air charge within intake manifold 22) may be determined using a manifold absolute pressure (MAP) sensor 124.

Intake manifold 22 may be coupled to a series of combustion chambers 30 through a series of intake valves (not shown). Combustion chambers 30 may further be coupled to an exhaust manifold 36 via a series of exhaust valves (not shown). In the depicted embodiment, a single exhaust manifold 36 is shown. However, in other embodiments, exhaust manifold 36 may include a plurality of exhaust manifold sections. Configurations having a plurality of exhaust manifold sections may enable effluent from different combustion chambers 30 to be directed to different locations in engine system 101. Likewise, configurations wherein intake manifold 22 includes a plurality of intake manifold sections may enable air sourced from different locations to be directed to different combustion chambers 30 of engine system 101 (usually cylinder banks). Further, intake manifold 22 may have multiple intake throttles 20 (such as one per bank).

In one embodiment, each of the exhaust and intake valves may be electronically actuated or controlled (e.g., via control system 14). In another embodiment, each of the exhaust and intake valves may be cam actuated or controlled. Whether electronically actuated or cam actuated, the timing of exhaust and intake valve opening and closure may be adjusted for a desired combustion and emissions-control performance. For example, a cam timing may be adjusted via a variable cam timing system to move intake and exhaust cams to a position which provides an optimal volumetric efficiency for given operating conditions.

In some embodiments, engine 10 may also be configured for selective cylinder deactivation, wherein individual cylinder valve operation may be selectively deactivated via individual cylinder valve mechanisms (including intake and exhaust valve cams), and individual cylinder fueling may be selectively deactivated via deactivatable fuel injectors.

Combustion chambers 30 may be supplied one or more fuels, such as gasoline, alcohol fuel blends, diesel, biodiesel, compressed natural gas, etc. Fuel may be supplied to combustion chambers 30 via direct injection, port injection, throttle valve-body injection, or any combination thereof. In the depicted example, fuel is provided to each combustion chamber 30 via direct injection by a fuel injector 66 (while only one fuel injector 66 is shown in FIG. 1, each combustion chamber 30 includes a fuel injector coupled thereto). In other examples, fuel injector 66 may be coupled to an intake port, upstream of an intake valve, to provide fuel via port injection. Further still, fuel may be provided to a given combustion chamber 30 via multiple fuel injectors including multiple direct injectors, multiple port injectors, or a combination thereof. Fuel may be delivered to fuel injector 66 by a fuel system (not shown) including a fuel tank, a fuel pump, and a fuel rail. In combustion chambers 30, combustion may be initiated via spark ignition and/or compression ignition.

As shown in FIG. 1, exhaust from exhaust manifold 36 may be directed to turbine 116 to drive turbine 116. When reduced turbine torque is desired, a portion of exhaust may be directed instead through a turbine bypass 90 (e.g., a waste-gate), bypassing turbine 116. A turbine bypass actuator (e.g., turbine bypass valve 92) may be actuated open to relieve at least some exhaust pressure from upstream of turbine 116 to a location downstream of turbine 116 via turbine bypass 90. By reducing exhaust pressure upstream of turbine 116, turbine speed may be reduced.

A combined flow from turbine 116 and turbine bypass 90 flows through an emission control device 170. In general, emission control device 170 may include one or more exhaust after-treatment components configured to reduce an amount of one or more substances in the exhaust flow. For example, one exhaust after-treatment component may be configured to trap nitrogen oxides ($NO_x$) from the exhaust flow when the exhaust flow is lean and to reduce the trapped $NO_x$ when the exhaust flow is rich. In other examples, an exhaust after-treatment component may be configured to disproportionate $NO_x$ or to selectively reduce $NO_x$ with the aid of a reducing agent. In still other examples, emission control device 170 includes a three-way catalyst configured to oxidize residual hydrocarbons and carbon monoxide while reducing $NO_x$ in the exhaust flow. Different exhaust after-treatment catalysts having any such functionality may be arranged in wash coats or elsewhere in emission control device 170, either separately or together. In some embodiments, emission control device 170 may further include a regeneratable soot filter configured to trap and oxidize soot particles in the exhaust flow.

All or part of the treated exhaust from emission control device 170 may be released into the atmosphere via an exhaust conduit 35 (also referred to as tailpipe 35 herein). Depending on operating conditions, however, some exhaust may be diverted instead to intake passage 42 via an exhaust gas recirculation (EGR) passage (not shown), including an EGR cooler and an EGR valve. Exhaust may be recirculated to the inlet of compressor 114. Exhaust may be recirculated to intake manifold 22 nominally with EGR flow enabled only when the intake manifold pressure is less than an exhaust manifold pressure. At high load conditions, such as when engine 10 operates boosted and with a higher manifold pressure, EGR flow may be disabled. As such, it may not be efficient to flow EGR in high load conditions.

One or more sensors may be coupled to the inlet of compressor 114. For example, a temperature sensor 55 may be coupled to the inlet of compressor 114 for estimating a compressor inlet temperature. As another example, a pressure sensor 56 may be coupled to the inlet of compressor 114 for estimating a pressure of air entering compressor 114. Still other sensors (not shown) may include, for example, air-fuel ratio sensors, humidity sensors, etc. In other examples, one or more of compressor inlet conditions (such as humidity, temperature, etc.) may be inferred based on engine operating conditions. The sensors may estimate a condition of intake air received at the compressor inlet from intake passage 42 as well as air charge recirculated from upstream of CAC 18. One or more sensors may also be coupled to intake passage 42 upstream of compressor 114 for determining a composition and condition of air charge entering the compressor. These sensors may include, for example, a barometric pressure sensor 58. In addition, a throttle inlet pressure (TIP) sensor 59 may be coupled downstream of CAC 18 and upstream of throttle valve 20 for estimating or measuring a boost pressure delivered to engine 10.

During an operator tip-in event, when going from engine operation without boost to engine operation with boost responsive to an increase in operator torque demand, turbo lag may occur. This may be due to delays in turbine 116 spin-up due to turbocharger 15 being a slower-acting compression device. The same may also occur when engine 10 is operating boosted and there is a transient increase in boost demand due to an increase in accelerator pedal application by a vehicle operator. To improve turbine spin-up, during those selected conditions, turbine bypass valve 92 may be actuated to a more closed position (e.g., to a fully closed position). In addition, when included in electric boosting device 103, turbocharger 15 may be electrically assisted by receiving positive torque from electric motor 108. Therein, electric motor 108 may add torque to turbocharger shaft 19 connecting turbine 116 to compressor 114 by drawing power from system battery 45.

During an operator tip-out event, when going from engine operation with boost to engine operation without boost (or reduced boost), compressor surge may occur. This may be due to a reduced forward flow through compressor 114 when throttle valve 20 closes at tip-out. The reduced forward flow through compressor 114 may cause surge and degrade turbocharger performance. In addition, surge may lead to noise, vibration, and harshness (NVH) issues such as undesirable noise from the engine intake system. To enable a torque demand to be rapidly reduced responsive to the tip-out without incurring compressor surge during a default mode of vehicle operation, at least a portion of air charge compressed by compressor 114 may be recirculated to the compressor inlet. This may increase compressor flow rate to move operation away from a surge region. In particular, CRV 62 may be opened to recirculate (warm) compressed air from the outlet of compressor 114, downstream of CAC 18, to the inlet of compressor 114. In some embodiments, the compressor recirculation system may additionally or alternatively include a recirculation passage for recirculating cooled compressed air from downstream of CAC 18 to the inlet of compressor 114. In addition, turbine bypass valve 92 may be moved to a more open (e.g., fully open) position so that more of the exhaust flow travels to tailpipe 35 while bypassing turbine 116, thereby expediting turbine spin-down. Further still, when included in electric boosting device 103, turbocharger 15 may be electrically assisted by receiving negative torque from electric motor 108. Therein, electric motor 108 may remove torque from turbocharger shaft 19 connecting turbine 116 to compressor 114, while charging battery 45.

Controller 12 may be included in control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 (which may be a temperature or pressure sensor) located upstream of turbine 116, MAP sensor 124, an exhaust temperature sensor 128 located downstream of turbine 116, an exhaust pressure sensor 129 located downstream of turbine 116, compressor inlet temperature sensor 55, compressor inlet pressure sensor 56, a mass air flow (MAF) sensor 57, barometric pressure sensor 58, and TIP sensor 59. Other sensors, such as additional pressure, temperature, air/fuel ratio, and composition sensors, may be coupled to various locations in hybrid electric vehicle system 100 within the scope of this disclosure. Actuators 81 may include, for example, throttle valve 20, CRV 62, electric motor 108, turbine bypass valve 92, and fuel injector 66. Controller 12 may receive input data from the various sensors, process the input data, and employ the various actuators to adjust engine operation based on received signals and instructions stored on a memory of controller 12. Controller 12 may employ actuators 81 in response to the processed input data based on instructions or code programmed therein corresponding to one or more routines, such as the example control routine described herein with reference to FIGS. 3A and 3B. As an example, and as described below with reference to FIG. 2, controller 12 may pass a plurality of inputs (e.g., engine operating conditions, vehicle system conditions) through a logic sub system to output parameters (e.g., electrical loads, boost pressure) used by the example control routine of FIGS. 3A and 3B. The example control routine may then instruct controller 12 to employ actuators 81 to control electric machine 52 and electric boosting device 103 in tandem to provide an increased engine load during an engine cold start. In this way, the increased engine load may be provided to warm up an exhaust flow for expedited catalyst light-off.

Referring now to FIG. 2, a high-level diagram 200 of an input-output scheme for a logic subsystem of a vehicle controller, such as controller 12 of FIG. 1, is depicted. Further components described with reference to high-level diagram 200 may be embodiments of corresponding components of hybrid electric vehicle system 100 of FIG. 1. The vehicle controller may be operable, via one or more control routines, to adjust an engine load during an engine cold start.

As such, the vehicle controller may implement control logic 202 as machine-readable instructions in a non-transitory memory of the logic subsystem. Control logic 202 may be operable to receive one or more inputs 204, process the one or more inputs 204, and produce one or more outputs 206.

The one or more inputs 204 may include one or more engine operating conditions used to determine a current state of engine operation (e.g., at the engine cold start). For example, the one or more inputs 204 may include an exhaust gas temperature, an engine speed, and an engine load. The one or more inputs 204 may further include a desired exhaust gas temperature, for example, a minimum exhaust gas temperature for a desired catalyst light-off. Other parameters employable by the one or more control routines may be included in the one or more inputs 204, such as an SOC of a battery. The battery SOC may indicate an amount of charge that a battery included in the vehicle may take on without discharging.

The one or more inputs 204 may be processed to generate the one or more outputs 206, each of which may be a function of at least one of the one or more inputs 204. The one or more outputs 206 may include a boost pressure and electrical loads to be generated by an electric machine and to be consumed by an electric boosting device. For example, the electric machine may be operated as a generator to increase the engine load and generate a first electrical load. The one or more inputs 204 may be used to determine an amount of the first electrical load which may be used to charge the battery (e.g., up to a total charge capacity of the battery). If the battery cannot accept all of the first electrical load, the controller logic 202 may determine a second electrical load which the battery may discharge when the battery SOC surpasses a charge threshold. The second electrical load may be consumed by, and thereby power, the electric boosting device. As such, the electric boosting device may generate the boost pressure, which the vehicle controller may regulate by way of various actuators (e.g., an intake throttle, a turbine bypass valve, vanes of a VNT, etc.) In this way, a vehicle controller may be operable to balance and optimize various engine and vehicle operating conditions when an increase in engine load is requested.

Figure 3A:
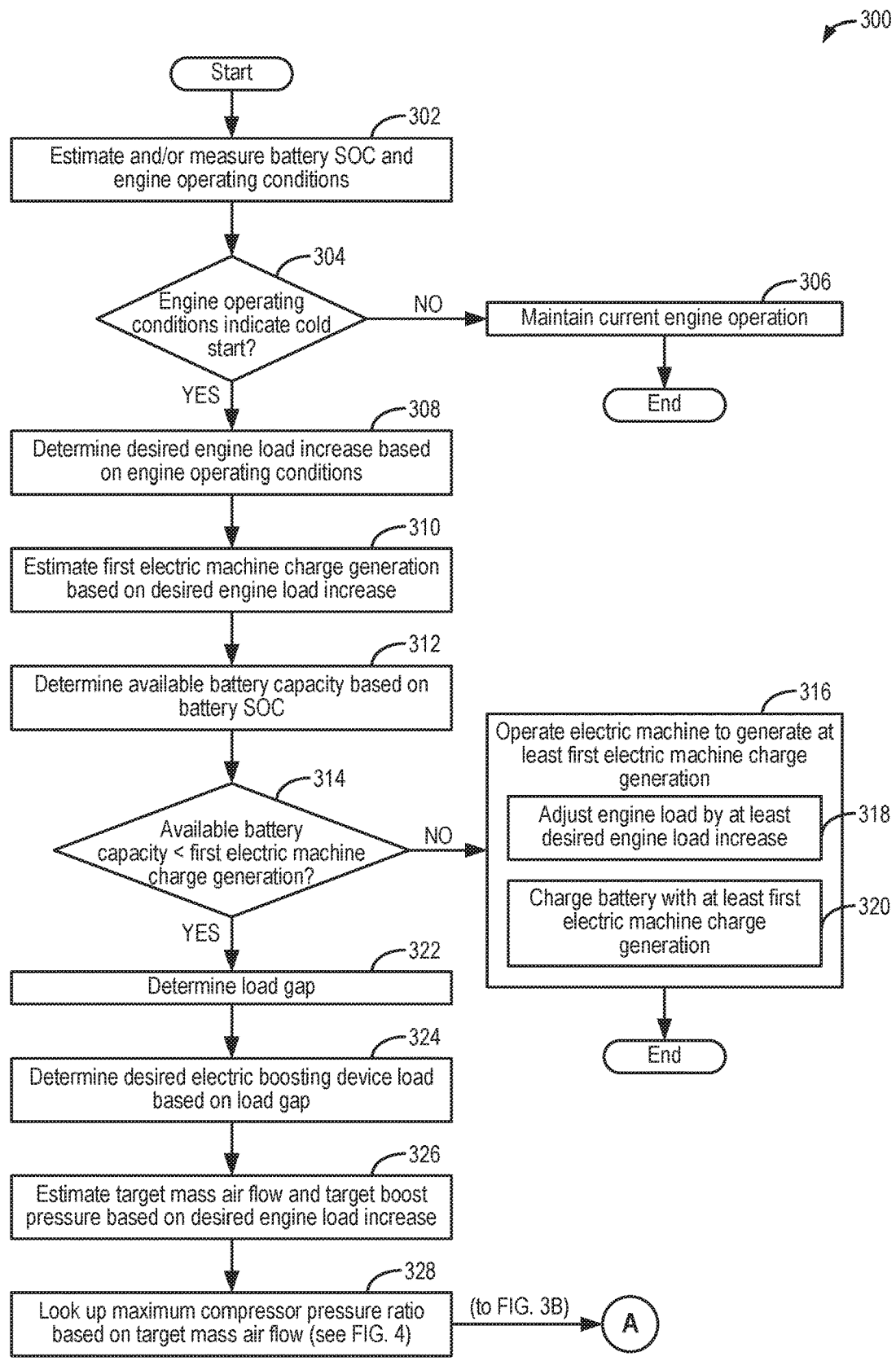
FIGS. 3A and 3B show a flow chart of a method for operating an electric machine in the vehicle as a generator during the engine cold start.
Figure 3B:
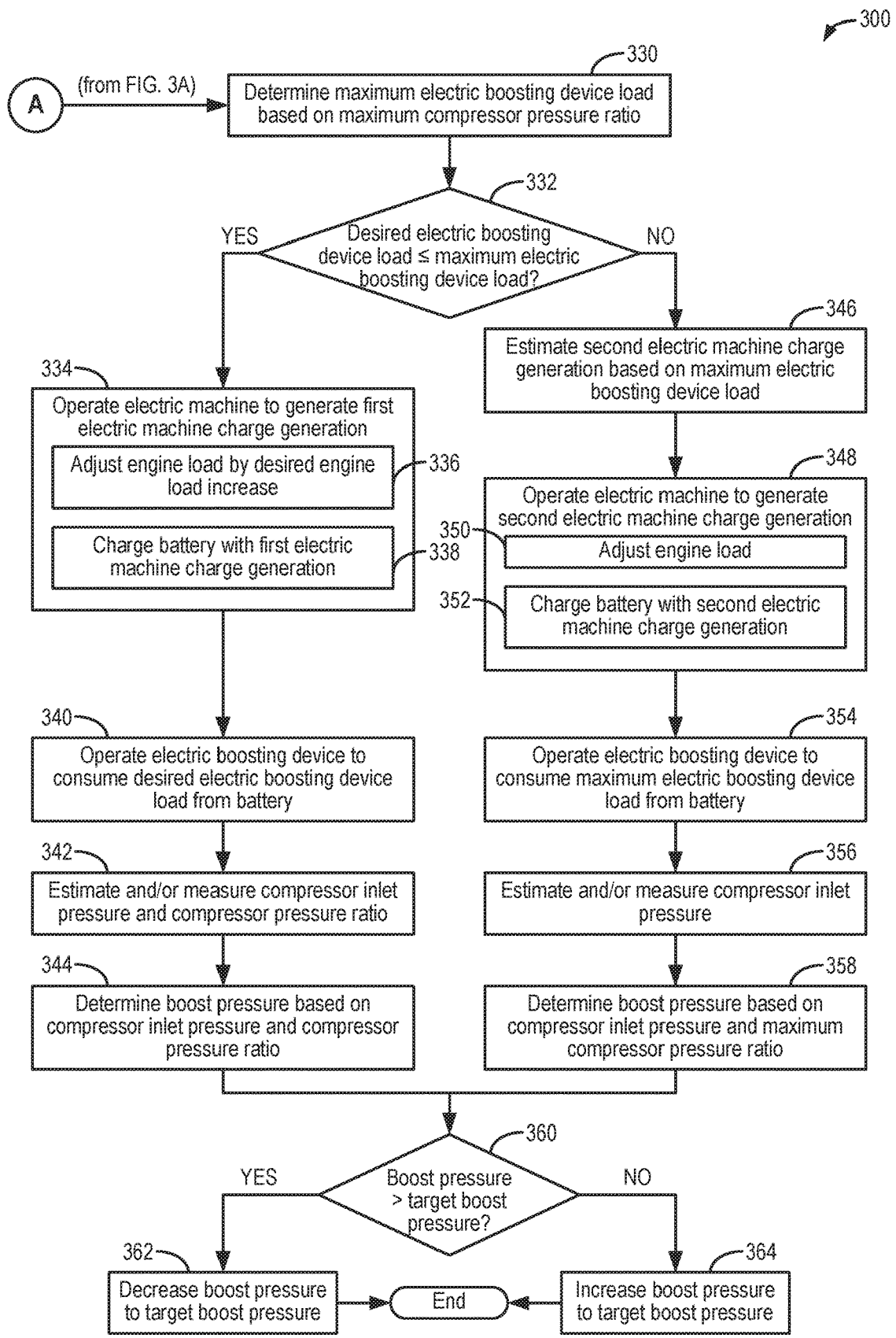

Referring now to FIGS. 3A and 3B, a flow chart of an example routine 300 for a hybrid electric vehicle system is depicted. The hybrid electric vehicle system may be hybrid electric vehicle system 100 of FIG. 1, for example. Further, components described with reference to routine 300 may be embodiments of corresponding components of hybrid electric vehicle system 100 of FIG. 1. Instructions for carrying out routine 300 and further methods included herein may be executed by a controller, such as controller 12 described above with reference to FIG. 1, based on instructions stored on a memory of the controller and in conjunction with signals received from sensors of an engine system, such as the sensors and the engine system described above with reference to FIG. 1. For example, sensors 55, 56, 57, 58, 59, 124, 126, 128, 129 may supply feedback to controller 12 of engine system 101. Further, the controller may employ engine actuators of the engine system to adjust engine operation in the physical world, according to the methods described below. As such, routine 300 may operate an electric machine, such as electric machine 52 of FIG. 1, as a generator during an engine cold start to increase an engine load. Further, when a battery, such as system battery 45 of FIG. 1, reaches a charge threshold, the battery may discharge to power an electric boosting device, such as the electric boosting device 103 of FIG. 1. In this way, the engine load may be increased to concomitantly increase an exhaust gas temperature with limited effect on overall engine performance.

Beginning at FIG. 3A, at 302, routine 300 may include estimating and/or measuring a battery SOC and one or more engine operating conditions, including exhaust gas temperature (also referred to herein as actual exhaust gas temperature), engine temperature, engine speed, engine load, and exhaust gas air-fuel ratio. The one or more engine operating conditions may be measured by one or more sensors communicatively coupled to the controller (e.g., the exhaust gas temperature may be measured directly via the exhaust temperature sensor 128) or may be inferred based on available data (e.g., the engine temperature may be estimated from an engine coolant temperature measured by an engine coolant temperature sensor).

During execution of routine 300, the one or more engine operating conditions may constitute variables in a determination of further vehicle operating parameters (e.g., electrical loads, boost pressure, etc.). Further, routine 300 may use the one or more engine operating conditions to infer a current state of engine operation. For example, at 304, routine 300 may include determining whether the one or more engine operating conditions indicate an engine cold start. The one or more engine operating conditions indicating the engine cold start may include, for example, an engine temperature being lower than a temperature threshold at a time of engine start. The threshold temperature for the engine cold start may be a light-off temperature of an exhaust catalyst included downstream of the engine, for example. In some examples, the threshold temperature for the engine cold start may be a function of a light-off temperature for each of a plurality of exhaust catalysts included downstream of the engine. As another example, the engine cold start may be indicated when the engine temperature is substantially equal to the ambient temperature (e.g., within a threshold of the ambient temperature, such as within 10 degrees of the ambient temperature) at engine start.

As a further example, the engine cold start may be indicated when the engine is started (e.g., cranked from zero speed to a non-zero speed, with fuel provided to initiate combustion) responsive to an engine start request after a prolonged period of engine inactivity, such as when the engine has been inactive for greater than a first threshold duration. The first threshold duration may refer to an amount of time over which the engine is expected to cool to the ambient temperature, for example. In one example, the first threshold duration may be a fixed time duration. In another example, the first threshold duration may be adjusted based on one or more of the engine temperature and the ambient temperature at the prior engine shutdown. The engine start may be requested by a vehicle operator, such as via a vehicle key-on event, or by the controller (e.g., based on the torque demand).

If the one or more engine operating conditions do not indicate the engine cold start, for example, if the engine temperature is higher than the threshold temperature for the engine cold start, routine 300 may progress to 306 to maintain current engine operation. For example, the electric machine of the hybrid electric vehicle system may operate as a motor to power the vehicle or as a generator during regenerative braking, but the engine load may not be actively adjusted to increase the exhaust gas temperature. Routine 300 may then end.

If the one or more engine operating conditions indicate the engine cold start, for example, if the engine temperature is lower than the threshold temperature for the engine cold start, routine 300 may progress to 308 to determine a desired engine load increase based on the one or more engine operating conditions. For example, the desired engine load increase may be a function of the actual exhaust gas temperature, the engine speed, and the engine load. Further, since the engine load may correspond to a torque output by the engine, the desired engine load increase may correspond to increased engine torque. Since the desired engine load increase may be determined by the controller to increase the actual exhaust gas temperature to a desired exhaust gas temperature (thereby assisting the exhaust catalysts in achieving light-off), the desired engine load increase may further be a function of the desired exhaust gas temperature. Thus, the desired engine load increase may be selected to increase the actual exhaust gas temperature by a predetermined amount (e.g., to the desired exhaust gas temperature) within a desired duration. For example, the desired duration may be a first, non-zero duration corresponding to an amount of time predetermined to maintain total cold-start emissions below an emissions threshold. The function for determining the desired engine load increase, along with other functions described below with reference to routine 300, may be stored in the memory of the controller, along with empirical data useful in executing the function. As such, the controller may input the current exhaust gas temperature, the desired exhaust gas temperature, the engine speed, and the engine load into one or more look-up tables, functions, or maps stored in memory, which may output the corresponding desired engine load increase for the input operating conditions. For example, the function may be referenced or indexed to estimated and/or measured values of the engine speed, the engine load, the actual exhaust gas temperature, and the desired exhaust gas temperature that have been empirically determined to result in the desired engine load increase via operation of the engine on a dynamometer and assessing resultant catalyst light-off times.

At 310, routine 300 may include estimating a first electric machine charge generation based on the desired engine load increase. The electric machine may be operated as a generator to enable the engine load to be increased by the desired engine load increase, and may thus generate a charge, referred to herein as an electric machine charge generation. The first electric machine charge generation may be a total amount of charge produced by a first electric machine load, or current, over the first duration. That is, provided the first duration and the first electric machine load, the total amount of charge generated by the electric machine may be determined by multiplying the first electric machine load with the first duration. As a further example, the controller may input the desired engine load increase and the first duration into one or more look-up tables, functions, or maps stored in memory, which may output the corresponding first electric machine generation for the input conditions.

At 312, routine 300 may include determining an available battery capacity based on the battery SOC. The available battery capacity may be an amount of charge which the battery may store based on a current level of charge. The battery SOC may be a percentage value indicating the current level of charge of the battery as compared to a total charge capacity of the battery. As such, the available battery capacity ($C_{avail}$) may be considered a function of the battery SOC (SOC) and the total charge capacity of the battery ($C_{total}$). For example, the available battery capacity may be determined according to equation (1) as:

$$C_{avail} = C_{total} - SOC \times C_{total} \quad (1)$$

At 314, routine 300 may include determining whether the available battery capacity is less than the first electric machine charge generation. If the available battery capacity is determined to be greater than or equal to the first electric machine charge generation (that is, if the battery can be charged with the first electric machine charge generation without discharging at least a portion of the first electric machine charge generation to avoid surpassing the total charge capacity of the battery), routine 300 may proceed to 316 to operate the electric machine as a generator to generate at least the first electric machine charge generation. As a result, at 318, the engine load may be adjusted by at least the desired engine load increase. Adjusting the engine load by at least the desired engine load increase may increase the actual exhaust gas temperature to at least the desired exhaust gas temperature. The engine load may be adjusted by adjusting one or more engine operating parameters. For example, the engine load may be increased by increasing intake mass air flow and/or increasing fueling to the engine. The electric machine may exert a negative braking torque on the engine during generation of the at least the first electric machine charge generation, thereby enabling a positive torque generated by the engine to be increased while a net torque produced by both the electric machine and the engine may continue to meet a torque demand. As indicated at 320, the battery may then be charged with the at least the first electric machine charge generation. The electric machine may provide the at least the first electric machine charge generation to the battery via at least the first electric machine load. Thus, the at least the desired engine load increase may be achieved without operating the electric boosting device. Routine 300 may then end.

If the available battery capacity is determined to be less than the first electric machine charge generation (that is, if the battery cannot be charged with the first electric machine charge generation without surpassing the total charge capacity of the battery), routine 300 may proceed to 322 to determine a load gap. The load gap may be a difference between the desired engine load increase and an amount of electric machine load the battery is able to accept (e.g., based on the available battery capacity).

At 324, routine 300 may include determining a desired electric boosting device load based on the load gap. That is, the electric boosting device may be operated to consume an electrical load proportional to the load gap to avoid battery overcharge while operating the electric machine to generate the first electric machine load. The desired electric boosting device load may be lower than the load gap, as at least a portion of the first electric machine load may be lost upon transfer to the battery and then to the electric boosting device. As an example, the desired electric boosting device load may be determined by multiplying the load gap by an efficiency of converting the engine load (e.g., kinetic energy) to the first electric machine load (e.g., electrical energy) and then of converting the first electric machine load to the desired electric boosting device load. As such, in some examples, the battery may be charged with the first electric machine load while providing the desired electric boosting device load to power the electric boosting device.

However, powering the electric boosting device in this way may produce excess boost pressure, which may, in some examples, be unfavorable to engine performance. As such, the controller may adjust one or more engine actuators to adjust the boost pressure to a target boost pressure and thereby optimize engine performance under constraints of the desired engine load increase. Further, the controller may opportunistically coordinate the target boost pressure to correspondingly alter an intake mass air flow to a target mass air flow to compensate the desired engine load increase. For example, at 326, routine 300 may include estimating the target mass air flow and the target boost pressure based on the desired engine load increase.

At 328, routine 300 may include looking up a maximum compressor pressure ratio based on the target mass air flow. In general, a compressor pressure ratio may be a ratio of the boost pressure (e.g., compressor outlet pressure) to a compressor inlet pressure. Since the compressor inlet pressure may depend on the intake mass air flow, the compressor pressure ratio may also depend on the intake mass air flow. The maximum compressor pressure ratio is a highest compressor pressure ratio possible, and may be considered a function of the intake mass air flow and a maximum boost pressure. The controller may include a map (e.g., a table, a curve) of a dependency of the maximum compressor pressure ratio on the intake mass air flow stored in non-transitory memory, such as the map described below with reference to FIG. 4. As such, the controller may look up the maximum compression pressure ratio for a given target mass air flow by inputting the target mass air flow into the map and determine the maximum compression pressure ratio which corresponds to the target mass air flow therefrom.

Figure 4:
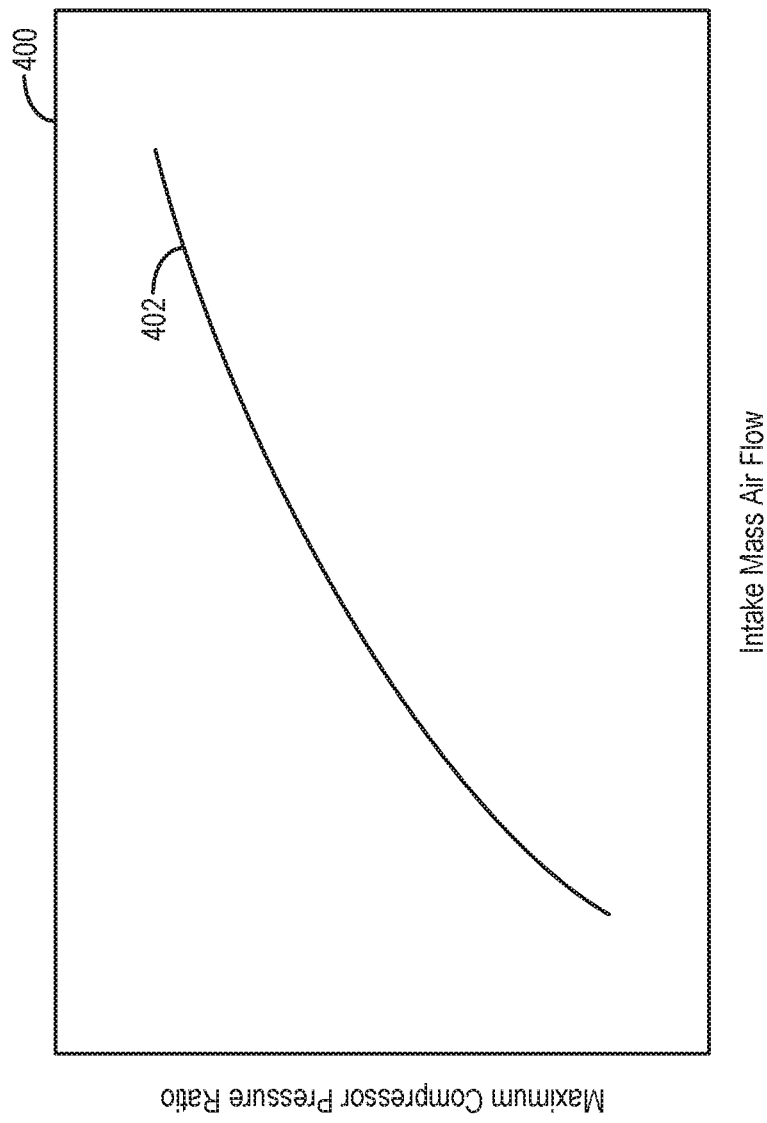
FIG. 4 shows a map of a maximum compressor pressure ratio as a function of an intake mass air flow for an electric boosting device.

Referring now to FIG. 4, a map 400 includes a curve 402 plotting the maximum compressor pressure ratio as a function of the intake mass air flow is depicted, where the intake mass air flow is plotted along an abscissa (increasing from left to right of the abscissa) and the maximum compressor pressure ratio is plotted along an ordinate (increasing from bottom to top of the ordinate). As shown, curve 402 indicates that the maximum compressor pressure ratio may increase as the intake mass air flow increases. A given maximum compressor pressure ratio may be looked up by providing map 400 with a corresponding intake mass air flow. The map 400 may be stored on a vehicle controller, such as controller 12 of FIG. 1, and may be employed by one or more control routines stored thereon, such as the example control routine described herein with reference to FIGS. 3A and 3B.

Referring again to FIGS. 3A and 3B and continuing now to FIG. 3B, at 330, routine 300 may include determining a maximum electric boosting device load based on the maximum compressor pressure ratio. Specifically, the maximum electric boosting device load is a highest electrical load which the electric boosting device may consume (that is, an electrical load which the electric boosting device may consume at the maximum compressor pressure ratio). As such, in some examples, the electric boosting device may be able to consume only a portion of the desired electric boosting device load.

At 332, routine 300 may include determining whether the desired electric boosting device load is less than or equal to the maximum electric boosting device load. If the desired electric boosting device load is determined to be less than or equal to the maximum electric boosting device load, routine 300 may proceed to 334 to operate the electric machine as a generator to generate the first electric machine charge generation. As a result, at 336, the engine load may be adjusted by the desired engine load increase. Adjusting the engine load by the desired engine load increase may increase the actual exhaust gas temperature to the desired exhaust gas temperature. The engine load may be adjusted by adjusting one or more engine operating parameters. For example, the engine load may be increased by increasing intake mass air flow and/or increasing fueling to the engine. The electric machine may exert a negative braking torque on the engine during generation of the first electric machine charge generation, thereby enabling a positive torque generated by the engine to be increased while a net torque produced by both the electric machine and the engine may continue to meet a torque demand. As indicated at 338, the battery may then be charged with the first electric machine charge generation. The electric machine may provide the first electric machine charge generation to the battery via the first electric machine load.

As described above, when the battery is unable to store the first electric machine charge generation, the battery may discharge at least a portion of stored charge to power the electric boosting device. In examples wherein the electric boosting device is able to consume such excess electrical load from the battery (that is, in examples wherein the desired electric boosting device load is determined to be less than or equal to the maximum electric boosting device load), the electric machine may be operated as a generator to successfully increase the engine load by the desired engine load increase and generate the first electric machine charge generation which may be passed from the electric machine to the battery. Further, at 340, routine 300 may include operating the electric boosting device to consume the desired electric boosting device load from the battery. As such, the electric boosting device may draw charge from the battery by consuming the desired electric boosting device load. Said another way, the battery may power the electric boosting device by discharging charge to the electric boosting device.

At 342, routine 300 may include estimating and/or measuring the compressor inlet pressure and the compressor pressure ratio. The compressor inlet pressure may be output by a sensor disposed adjacent to the compressor inlet. For example, the compressor inlet pressure may be output by a pressure sensor positioned upstream of a compressor of the electric boosting device, such as pressure sensor 56 of FIG. 1. The compressor pressure ratio may be estimated based on the desired electric boosting device load and the target mass air flow.

At 344, routine 300 may include determining the boost pressure based on the compressor inlet pressure and the compressor pressure ratio. As described above, since the compressor pressure ratio may be the ratio of the boost pressure to the compressor inlet pressure, the boost pressure may be determined by multiplying the compressor pressure ratio by the compressor inlet pressure.

Returning to 332, if, on the other hand, the desired electric boosting device load is determined to be greater than the maximum electric boosting device load, routine 300 may proceed to 346 to estimate a second electric machine charge generation based on the maximum electric boosting device load. As described above, when the battery is unable to store the first electric machine charge generation, the battery may discharge at least a portion of stored charge to power the electric boosting device. In examples wherein the electric boosting device is unable to consume such excess electrical load from the battery (that is, in examples wherein the desired electric boosting device load is determined to be greater than the maximum electric boosting device load), the electric machine may be unable to increase the engine load by the desired engine load increase, as the electric machine may not generate a greater combined charge than the battery may store and the electric boosting device may consume. The electric machine may instead be operated as a generator to generate the second electric machine charge generation, which may be less than the first electric machine charge generation. The second electric machine charge generation may be a total amount of charge produced by a second electric machine load, or current, over a second duration, where the second duration may be a total amount of time over which the second electric machine load is generated.

At 348, routine 300 may include operating the electric machine as a generator to generate the second electric machine charge generation. As a result, at 350, the engine load may be adjusted. Adjusting the engine load may include adjusting the engine load by less than the desired engine load increase, as the second electric machine charge generation may not be sufficient to realize the desired engine load increase. As such, adjusting the engine load may not increase the actual exhaust gas temperature to the desired exhaust gas temperature as quickly as when the engine load is increased by the desired engine load increase determined above at 308. However, the engine load may still be increased by at least a portion of the desired engine load increase, and the actual exhaust gas temperature may still increase faster than when the engine load is not increased. In this way, catalyst light-off may not be achieved as quickly as desired, but may still be achieved quicker than typical engine operation (e.g., absent execution of routine 300). The engine load may be adjusted by adjusting one or more engine operating parameters. For example, the engine load may be increased by increasing intake mass air flow and/or increasing fueling to the engine. The electric machine may exert a negative braking torque on the engine during generation of the second electric machine charge generation, thereby enabling a positive torque generated by the engine to be increased while a net torque produced by both the electric machine and the engine may continue to meet a torque demand. As indicated at 352, the battery may then be charged with the second electric machine charge generation. The electric machine may provide the second electric machine charge generation to the battery via the second electric machine load.

Further, at 354, routine 300 may include operating the electric boosting device to consume the maximum electric device boosting load from the battery. As such, the electric boosting device may draw charge from the battery by consuming the maximum electric boosting device load. Said another way, the battery may power the electric boosting device by discharging charge to the electric boosting device.

At 356, routine 300 may include estimating and/or measuring the compressor inlet pressure. The compressor inlet pressure may be output by a sensor disposed adjacent to the compressor inlet. For example, the compressor inlet pressure may be output by a pressure sensor positioned upstream of a compressor of the electric boosting device, such as pressure sensor 56 of FIG. 1.

At 358, routine 300 may include determining the boost pressure based on the compressor inlet pressure and the maximum compressor pressure ratio. As described above, since a given compressor pressure ratio may be the ratio of the boost pressure to the compressor inlet pressure, the boost pressure may be determined by multiplying the maximum compressor pressure ratio by the compressor inlet pressure.

Upon determination of the boost pressure at either 344 or 358, routine 300 may proceed to 360 to determine whether the boost pressure is greater than the target boost pressure. If the boost pressure is determined to be greater than the target boost pressure, routine 300 may proceed to 362 to actively decrease the boost pressure to the target boost pressure. Decreasing the boost pressure may include fully opening the turbine bypass valve (e.g., of the turbine of the electric boosting device). In examples wherein the electric boosting device includes a VNT, decreasing the boost pressure may include increasing an aspect ratio of the VNT to a maximum aspect ratio by, for example, fully opening the vanes of the VNT. With the turbine bypass valve and/or the vanes of the VNT fully opened, the boost pressure may be adjusted to the target boost pressure by correspondingly adjusting the intake throttle. Adjusting the boost pressure in this way may correspondingly adjust the engine air-fuel ratio, as the engine air-fuel ratio may be affected by the intake mass air flow which, as described above, may be altered by adjusting the boost pressure. In some examples, a boost pressure difference may be determined between the boost pressure and the target boost pressure. The boost pressure difference may be an excess boost pressure which may be opportunistically employed to retard an ignition timing, thereby adjusting the engine torque. Routine 300 may then end.

If the boost pressure is determined to be less than the target boost pressure, routine 300 may proceed to 364 to actively increase the boost pressure to the target boost pressure. Increasing the boost pressure may include fully opening the intake throttle. With the intake throttle fully opened, the boost pressure may be adjusted to the target boost pressure by correspondingly adjusting the turbine bypass valve (e.g., of the turbine of the electric boosting device). Further, in examples wherein the electric boosting device includes a VNT, the boost pressure may be adjusted to the target boost pressure by correspondingly adjusting an aspect ratio of the VNT by, for example, adjusting the vanes of the VNT. Adjusting the boost pressure in this way may correspondingly adjust the engine air-fuel ratio, as the engine air-fuel ratio may be affected by the intake mass air flow which, as described above, may be altered by adjusting the boost pressure. Routine 300 may then end.

In this way, a control routine may be executed during an engine cold start to determine an available capacity of a battery, operate an electric machine as a generator to increase an engine load with an electrical load, and responsive to the available capacity of the battery being less than a charge threshold, consume at least a portion of the electrical load with an electric boosting device while adjusting an amount of boost pressure produced by the electric boosting device.

Referring now to FIG. 5, a timeline 500 depicting a first example operation of an electric machine and an electric boosting device is shown. In the first example operation, the electric machine may be operated as a generator to generate an electric machine charge generation, which may be fully stored at a battery. The first example operation may utilize a control routine for operating an electric machine in a vehicle as a generator during an engine cold start, such as routine 300 as described above with reference to FIGS. 3A and 3B.

Timeline 500 depicts a control routine status (e.g., on or off) for the first example operation at solid curve 501, the electric machine charge generation at solid curve 511, an exhaust gas temperature at solid curve 521, an SOC of the battery at solid curve 531, and an electrical load consumption of the electric boosting device at solid curve 541. Additionally, dashed curve 523 represents a desired exhaust gas temperature, dashed curve 533 represents a total charge capacity of the battery, and dashed curve 543 represents a maximum electrical load consumable by the electric boosting device. All curves are depicted over time (plotted along an abscissa, where time increases from left to right of the abscissa). Further, a dependent variable represented by each curve is plotted along a respective ordinate, where the dependent variable increases from bottom to top of the given ordinate (unless otherwise stated or shown).

Prior to t1, the vehicle is not in operation and the engine is shut down (e.g., having a speed of zero, without combustion occurring). At t1, responsive to an operator request, the engine is started. Due to the engine having been shut down longer than a threshold duration prior to t1, the engine start at t1 is determined to be an engine cold start.

Between t1 and t2, the engine cold start is ongoing. Therein, the exhaust gas temperature (curve 521) is steadily increasing. At t2, a request to increase the engine load is received at a controller and the control routine status (curve 501) is switched from off to on to increase the engine load by operating the electric machine as a generator to generate an electrical load, providing the electric machine charge generation (curve 511) to the battery. Between t2 and t3, the control routine status remains on and the electric machine continues to generate the electrical load. The control routine may determine that the battery is able to store the entire electric machine charge generation (e.g., by estimating the charge to be generated by the electric machine and then determining whether an available charge capacity of the battery is greater than that charge), and thus the battery SOC (curve 531) increases as the battery accepts charge. As a result of the electric machine operating as a generator, the engine load is increased as requested and a rate at which the exhaust gas temperature increases accelerates.

At t3, the exhaust gas temperature (curve 521) reaches the desired exhaust gas temperature (curve 523), and the control routine status (curve 501) is switched from on to off. When the control routine status is switched to off, the electric machine charge generation (curve 511) begins decreasing until, at t4, the electric machine ceases operating as a generator. Further, at t4, the battery stops receiving the electric machine charge generation from the electric machine, and thus the battery SOC (curve 531) levels off, not having reached the total charge capacity of the battery (curve 533). Since the battery SOC does not reach the total charge capacity of the battery during the first example operation, the electric boosting device is not operated and does not consume a portion of the electrical load, and thus the electric boosting device load consumption (curve 541) remains at zero. Thus, the electric boosting device load consumption does not approach the maximum electric boosting device load consumption (curve 543) during the first example operation.

Following t4, the vehicle continues typical vehicle operation until the engine is shut down.

Referring now to FIG. 6, a timeline 600 depicting second and third example operations of an electric machine and an electric boosting device is shown. In the second example operation, the electric machine may be operated as a generator to generate a first electric machine charge generation sufficient to enable a desired engine load increase to increase an exhaust gas temperature beyond a threshold within a desired duration. In the third example operation, the electric machine may be operated as a generator to generate a second electric machine charge generation insufficient to enable the desired engine load increase over the desired duration. Each of the second example operation and the third example operation may utilize a control routine for operating an electric machine in a vehicle as a generator during an engine cold start, such as routine 300 as described above with reference to FIGS. 3A and 3B.

Timeline 600 depicts a first control routine status (e.g., on or off) at solid curve 601, a second control routine status at long-dashed curve 602, the first electric machine charge generation at solid curve 611, the second electric machine charge generation at long-dashed curve 612, a first exhaust gas temperature at solid curve 621, a second exhaust gas temperature at long-dashed curve 622, a first SOC of a battery at solid curve 631, a second SOC of the battery at long-dashed curve 632, a first electrical load consumption of the electric boosting device at solid curve 641, a second electrical load consumption of the electric boosting device at long-dashed curve 642, a first boost pressure at solid curve 651, a second boost pressure at long-dashed curve 652, a turbine bypass valve position (e.g., ranging from fully open, labeled "open," to fully closed, labeled "closed") at solid curve 661, and an intake throttle position (e.g., ranging from fully open, labeled "open," to fully closed, labeled "closed") at solid curve 671. It may be understood that curves 601, 611, 621, 631, 641, and 651 are specific to the second example operation and that curves 602, 612, 622, 632, 642, and 652 are specific to the third example operation. Additionally, short-dashed curve 623 represents a desired exhaust gas temperature, short-dashed curve 633 represents a total charge capacity of the battery, short-dashed curve 643 represents a maximum electrical load consumable by the electric boosting device, and short-dashed curve 653 represents a target boost pressure. All curves are depicted over time (plotted along an abscissa, where time increases from left to right of the abscissa). Further, a dependent variable represented by each curve is plotted along a respective ordinate, where the dependent variable increases from bottom to top of the given ordinate (unless otherwise stated or shown). For simplicity, each of the second example operation and the third operation are depicted along the same axis. However, it will be understood that the second example operation and the third operation do not necessarily occur simultaneously.

Prior to t5, the vehicle is not in operation and the engine is shut down (e.g., having a speed of zero, without combustion occurring). At t5, responsive to an operator request, the engine is started. Due to the engine having been shut down longer than a threshold duration prior to t5, the engine start at t5 is determined to be an engine cold start.

Between t5 and t6, the engine cold start is ongoing. Therein, the exhaust gas temperature (e.g., curve 621) is steadily increasing. Further, the boost pressure (e.g., curve 651) is approximately at atmospheric pressure, as the electric boosting device is not active between t5 and t6. Additionally, the first battery SOC (curve 631) is lower than the second battery SOC (curve 632) at the engine cold start (that is, the battery SOC is lower at the engine cold start in the second example operation than in the third example operation).

At t6, a request to increase the engine load is received at a controller and the control routine status (e.g., curve 601) is switched from off to on to increase the engine load by operating the electric machine as a generator to generate an electrical load, providing the first electric machine charge generation (curve 611) and the second electric machine charge generation (curve 612) to the battery in the second and third example operations, respectively. Between t6 and t7, the control routine status remains on and the electric machine continues to generate the electrical load for each of the second and third example operations. Therein, the battery stores the first and second electric machine charge generations, and the first battery SOC (curve 631) and the second battery SOC (curve 632) respectively increase. As a result of the electric machine operating as a generator, the engine load is increased in each of the second and third example operations, and a rate at which the exhaust gas temperature (e.g., curve 621) increases accelerates.

At t7, each of the first battery SOC (curve 631) and the second battery SOC (curve 632) reaches within a threshold amount of the total charge capacity of the battery (curve 633) as a result of the battery respectively accepting the first electric machine charge generation (curve 611) and the second electric machine charge generation (curve 612), and thus the battery begins discharging some of the stored charge to power the electric boosting device. As such, each of the first electrical load consumption (curve 641) and the second electrical load consumption (curve 642) of the electric boosting device increases, and the first boost pressure (curve 651) and the second boost pressure (curve 652) respectively increase.

However, since the second battery SOC (curve 632) is higher than the first battery SOC (curve 631) when the engine cold start begins (at t5), the electric boosting device is unable to consume enough excess electrical load. That is, in the third example operation, the second electric boosting device load consumption (curve 642) reaches the maximum electric boosting device load consumption (curve 643). This limits the second electric machine charge generation (curve 612) below an optimal value [e.g., the first electric machine charge generation (curve 611)], and thus the engine load increase is unable to be achieved within a desired duration. As a result, the second exhaust gas temperature (curve 622) increases at a lower rate, and thus the second exhaust gas temperature fails to reach the desired exhaust gas temperature (curve 623) during a time depicted by timeline 600 (however, the second exhaust gas temperature may reach the desired exhaust gas temperature at a later time not shown on timeline 600).

In contrast, in the second example operation, the first electric boosting device load consumption (curve 641) remains below the maximum electric boosting device load consumption (curve 643) between t7 and t9, and thus the first battery SOC (curve 631) remains below the total charge capacity of the battery (curve 633).

Further, each of the first electric boosting device load consumption (curve 641) and the second electric boosting device load consumption (curve 642) have respectively increased the first boost pressure (curve 651) and the second boost pressure (curve 652) above the target boost pressure (curve 653). In the second example operation, the turbine bypass valve opens (curve 661) and the intake throttle is adjusted (curve 671) to decrease the first boost pressure to the target boost pressure. In the third example operation, the second boost pressure is used to retard ignition timing, and is thus not actively adjusted to the target boost pressure.

At t9, in the second example operation, the first exhaust gas temperature (curve 621) reaches the desired exhaust gas temperature (curve 623), and the first control routine status (curve 601) is switched from on to off. When the first control routine status is switched to off, the first electric machine charge generation (curve 611) begins decreasing until, between t9 and t10, the electric machine ceases operating as a generator. Further, the battery stops receiving the first electric machine charge generation from the electric machine and stops discharging to the electric boosting device, and thus the first battery SOC (curve 631) levels off, not having reached the total charge capacity of the battery (curve 633). At t10, the first boost pressure (curve 651) is determined to be close enough to the target boost pressure (curve 653), and thus the turbine bypass valve is fully closed (curve 661) and the intake throttle is fully opened (curve 671). Following t10, the vehicle continues typical vehicle operation until the engine is shut down.

In contrast, in the third example operation, the second control routine status (curve 602) remains on past t10 and beyond the time depicted by timeline 600, as the second exhaust gas temperature (curve 622) has not yet reached the desired exhaust gas temperature. Correspondingly, the electric boosting device continues to consume electrical load (e.g., curve 642) and the boost pressure continues to be generated (e.g., curve 652).

Referring now to FIG. 7, a timeline 700 depicting fourth and fifth example operations of an electric machine and an electric boosting device is shown. In the fourth example operation, the electric machine may be operated as a generator to generate a first electric machine charge generation sufficient to enable a desired engine load increase to increase an exhaust gas temperature beyond a threshold within a desired duration. In the fifth example operation, the electric machine may be operated as a generator to generate a second electric machine charge generation sufficient to enable a desired engine load increase to increase an exhaust gas temperature beyond a threshold within a desired duration, where the second electric machine charge generation is less than the first electric machine charge generation. Each of the fourth example operation and the fifth example operation may utilize a control routine for operating an electric machine in a vehicle as a generator during an engine cold start, such as routine 300 as described above with reference to FIGS. 3A and 3B.

Timeline 700 depicts control routine status (e.g., on or off) at solid curve 701, the first electric machine charge generation at solid curve 711, the second electric machine charge generation at long-dashed curve 712, a first exhaust gas temperature at solid curve 721, a second exhaust gas temperature at long-dashed curve 722, a first SOC of a battery at solid curve 731, a second SOC of the battery at long-dashed curve 732, a first electrical load consumption of the electric boosting device at solid curve 741, a second electrical load consumption of the electric boosting device at long-dashed curve 742, a first boost pressure at solid curve 751, a second boost pressure at long-dashed curve 752, a first turbine bypass valve position (e.g., ranging from fully open, labeled "open," to fully closed, labeled "closed") at solid curve 761, a second turbine bypass valve position at long-dashed curve 762, a first intake throttle position (e.g., ranging from fully open, labeled "open," to fully closed, labeled "closed") at solid curve 771, and a second intake throttle position at long-dashed curve 772. It may be understood that curves 711, 721, 731, 741, 751, 761, and 771 are specific to the fourth example operation and that curves 712, 722, 732, 742, 752, 762, and 772 are specific to the fifth example operation. Additionally, short-dashed curve 723 represents a desired exhaust gas temperature, short-dashed curve 733 represents a total charge capacity of the battery, short-dashed curve 743 represents a maximum electrical load consumable by the electric boosting device, and short-dashed curve 753 represents a target boost pressure. All curves are depicted over time (plotted along an abscissa, where time increases from left to right of the abscissa). Further, a dependent variable represented by each curve is plotted along a respective ordinate, where the dependent variable increases from bottom to top of the given ordinate (unless otherwise stated or shown). For simplicity, each of the fourth example operation and the fifth operation are depicted along the same axis. However, it will be understood that the fourth example operation and the fifth operation do not necessarily occur simultaneously.

Prior to t11, the vehicle is not in operation and the engine is shut down (e.g., having a speed of zero, without combustion occurring). At t11, responsive to an operator request, the engine is started. Due to the engine having been shut down longer than a threshold duration prior to t11, the engine start at t11 is determined to be an engine cold start.

Between t11 and t12, the engine cold start is ongoing. Therein, each of the first exhaust gas temperature (curve 721) and the second exhaust gas temperature (curve 722) is steadily increasing in the fourth and fifth example diagnostic operations, respectively. The first exhaust gas temperature is lower than the second exhaust gas temperature at the engine cold start (that is, the exhaust gas temperature is lower at the engine cold start in the fourth example operation than in the fifth example operation). Further, the boost pressure (e.g., curve 751) is approximately at atmospheric pressure, as the electric boosting device is not active between t11 and t12. Additionally, the first battery SOC (curve 731) is lower than the second battery SOC (curve 732) at the engine cold start (that is, the battery SOC is lower at the engine cold start in the fourth example operation than in the fifth example operation).

At t12, a request to increase the engine load is received at a controller and the control routine status (curve 701) is switched from off to on to increase the engine load by operating the electric machine as a generator to generate an electrical load, providing the first electric machine charge generation (curve 711) and the second electric machine charge generation (curve 712) to the battery in the fourth and fifth example operations, respectively. Between t12 and t13, the control routine status remains on and the electric machine continues to generate the electrical load for each of the fourth and fifth example operations. Therein, the battery stores the first and second electric machine charge generations, and the first battery SOC (curve 731) and the second battery SOC (curve 732) respectively increase. As a result of the electric machine operating as a generator, the engine load is increased in each of the fourth and fifth example operations, and a rate at which the exhaust gas temperature increases accelerates. Since the second exhaust gas temperature is higher at t12 than the first exhaust gas temperature, the second electric machine charge generation is correspondingly less than the first electric machine charge generation. This is because a smaller electrical load is needed to sufficiently increase the engine load to increase the second exhaust gas temperature to the desired exhaust gas temperature (curve 723) than for the first exhaust gas temperature.

At t13, each of the first battery SOC (curve 731) and the second battery SOC (curve 732) reaches within a threshold amount of the total charge capacity of the battery (curve 733) as a result of the battery respectively accepting the first electric machine charge generation (curve 711) and the second electric machine charge generation (curve 712), and thus the battery begins discharging some of the stored charge to power the electric boosting device. As such, each of the first electrical load consumption (curve 741) and the second electrical load consumption (curve 742) of the electric boosting device increases, and the first boost pressure (curve 751) and the second boost pressure (curve 752) respectively increase. However, since the first electric boosting device load consumption is higher than the second electric boosting device load consumption, the first boost pressure correspondingly increases at a higher rate than the second boost pressure.

Between t13 and t15, each of the first electric boosting device load consumption (curve 741) and the second electric boosting device load consumption remains below the maximum electric boosting device load consumption (curve 743), and thus each of the first battery SOC (curve 731) and the second battery SOC (curve 732) correspondingly remains below the total charge capacity of the battery (curve 733). In the fourth example operation, since the first electric boosting device load consumption has increased the first boost pressure (curve 751) above the target boost pressure (curve 753), the turbine bypass valve opens (curve 761) and the intake throttle is adjusted (curve 771) to decrease the first boost pressure to the target boost pressure. In the fifth example operation, since the second electric boosting device load consumption has not increased the second boost pressure (curve 752) above the target boost pressure, the intake throttle remains open (curve 772) and the turbine bypass valve is adjusted (curve 762) to increase the second boost pressure to the target boost pressure.

At t15, each of the first exhaust gas temperature (curve 721) and the second exhaust gas temperature (curve 722) reaches the desired exhaust gas temperature (curve 723), and the control routine status (curve 701) is switched from on to off. When the control routine status is switched to off, each of the first electric machine charge generation (curve 711) and the second electric machine charge generation (curve 712) begins decreasing until, between t15 and t16, the electric machine ceases operating as a generator. Further, the battery stops receiving each of the first electric machine charge generation and the second electric machine charge generation from the electric machine and stops discharging to the electric boosting device, and thus the battery SOC (e.g., curve 731) levels off, not having reached the total charge capacity of the battery (curve 733).

At t16, each of the first boost pressure (curve 751) and the second boost pressure (curve 752) is determined to be close enough to the target boost pressure (curve 753), and thus the turbine bypass valve is fully closed (e.g., curve 761) and the intake throttle is fully opened (e.g., curve 771). Following t16, the vehicle continues typical vehicle operation until the engine is shut down.

In this way, an electric machine disposed in a vehicle may function as a generator to increase an engine load during an engine cold start and thereby increase an exhaust gas temperature. The electric machine may further provide a charge to a battery. However, in some examples, an SOC of the battery may be too high to enable further charging. As such, an electric boosting device may draw charge from the battery, enabling the battery to continue storing charge from the electric machine. Thus, a technical effect of the electric boosting device drawing charge from the battery is that the engine load may be increased (correspondingly increasing the exhaust gas temperature) even in cases where the SOC of the battery is determined to be too high to accept at least a portion of the charge from the electric machine. Further, since the electric boosting device may be powered by the battery, a boost pressure may be generated. The boost pressure may be regulated so as to achieve a target boost pressure which may compensate the engine load increase. In some examples, excess boost pressure (e.g., boost pressure above the target boost pressure) may be used to retard ignition timing. The technical effect of achieving the target boost pressure and/or of retarding ignition timing is that emissions may be maintained or reduced during the engine cold start.

An example of a method comprises receiving a request to increase an engine load during an engine cold start, determining an available capacity of a battery, operating an electric machine as a generator to increase the engine load with a first electrical load, and responsive to the available capacity of the battery being less than a charge threshold, charging the battery with the first electrical load while generating an increased boost pressure with an electric boosting device by powering the electric boosting device via the battery, and coordinating an amount of the increased boost pressure to compensate the first electrical load. A first example of the method further comprises responsive to the available capacity of the battery being greater than or equal to the charge threshold, charging the battery with the first electrical load without operating the electric boosting device. A second example of the method, optionally including the first example of the method, further comprises determining one or more engine operating conditions, the one or more engine operating conditions comprising an exhaust gas temperature, an engine speed, and the engine load, and determining whether the engine cold start is indicated by the one or more engine operating conditions. A third example of the method, optionally including one or more of the first and second examples of the method, further comprises estimating a charge to be provided to the battery by the first electrical load, and determining the charge threshold based on the charge. A fourth example of the method, optionally one or more of the first through third examples of the method, further includes wherein powering the electric boosting device via the battery includes determining a second electrical load to be consumed by the electric boosting device based on the first electrical load, the available capacity of the battery, and an efficiency of converting the first electrical load to the second electrical load, and powering the electric boosting device by consuming the second electrical load, the second electrical load being provided by the battery. A fifth example of the method, optionally one or more of the first through fourth examples of the method, further comprising coordinating the amount of the increased boost pressure to adjust one or more of an engine air-fuel ratio and an engine torque.

An example of a system for increasing an engine load of an engine comprises an electric machine configured to operate as a generator for the engine, a battery coupled to the electric machine, the battery configured to accept charge generated by the electric machine, an electric boosting device coupled to the battery, the electric boosting device configured to draw charge from the battery, a controller storing instructions in non-transitory memory, the instructions executable by a processor to, during a cold start of the engine, determine an available capacity of the battery and a first charge to be generated by the electric machine, and responsive to the available capacity of the battery being less than the first charge, increase the engine load by a first amount by operating the electric machine, generate the first charge with the electric machine, charge the battery with the first charge while the electric boosting device draws a second charge from the battery such that a boost pressure is generated by the electric boosting device, the second charge being less than the first charge, and adjusting the boost pressure to compensate the first amount of the engine load. A first example of the system further includes wherein the instructions are executable to, responsive to the available capacity of the battery being greater than or equal to the first charge, increase the engine load by a second amount by operating the electric machine, the second amount greater than or equal to the first amount, generate the first charge with the electric machine, and charge the battery with the first charge. A second example of the system, optionally including the first example of the system, wherein the first amount of the engine load is selected to increase an exhaust gas temperature by a predetermined amount. A third example of the system, optionally including one or more of the first and second examples of the system, further includes wherein the instructions are executable to, responsive to the available capacity of the battery being less than the first charge, determine a desired electrical load to be consumed by the electric boosting device based on the first amount of the engine load, and determine the second charge based on the desired electrical load to be consumed by the electric boosting device. A fourth example of the system, optionally including one or more of the first through third examples of the system, further includes wherein the instructions are executable to, responsive to the available capacity of the battery being less than the first charge, determine a maximum electrical load consumable by the electric boosting device, and determine whether the desired electrical load to be consumed by the electric boosting device is less than the maximum electrical load consumable by the electric boosting device. A fifth example of the system, optionally one or more of the first through fourth examples of the system, further includes wherein the instructions are executable to, responsive to the desired electrical load being less than or equal to the maximum electrical load, operate the electric boosting device such that the desired electrical load is consumed by the electric boosting device. A sixth example of the system, optionally one or more of the first through fifth examples of the system, further includes wherein the instructions are executable to, responsive to the desired electrical load being greater than the maximum electrical load, operate the electric boosting device such that the maximum electrical load is consumed by the electric boosting device. A seventh example of the system, optionally one or more of the first through sixth examples of the system, further includes wherein adjusting the boost pressure to compensate the first amount of the engine load includes altering an intake mass air flow.

An example of a method for an engine cold start comprises operating an electric machine to increase an engine load such that a charge is generated by the electric machine, charging a battery with the generated charge while powering an electric boosting device via the battery such that a boost pressure is generated, determining a target boost pressure, and adjusting the generated boost pressure to match the target boost pressure. A first example of the method further includes wherein the generated boost pressure is greater than the target boost pressure, and adjusting the generated boost pressure to match the target boost pressure includes adjusting an intake throttle. A second example of the method, optionally including the first example of the method, further includes wherein adjusting the generated boost pressure to match the target boost pressure further includes fully opening a bypass valve of a turbine of the electric boosting device, and increasing an aspect ratio of a variable nozzle turbine of the electric boosting device to a maximum aspect ratio. A third example of the method, optionally including one or more of the first and second examples of the method, further includes wherein the generated boost pressure is less than the target boost pressure, and adjusting the generated boost pressure to match the target boost pressure includes adjusting a bypass valve of a turbine of the electric boosting device, and adjusting an aspect ratio of a variable nozzle turbine of the electric boosting device. A fourth example of the method, optionally one or more of the first through third examples of the method, further includes wherein adjusting the generated boost pressure to match the target boost pressure further includes fully opening an intake throttle. A fifth example of the method, optionally one or more of the first through fourth examples of the method, further comprises, responsive to the generated boost pressure being greater than the target boost pressure, determining a boost pressure difference based on the generated boost pressure and the target boost pressure, and retarding an ignition timing based on the boost pressure difference.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
receiving a request to increase an engine load during an engine cold start;
determining an available capacity of a battery;
operating an electric machine as a generator to increase the engine load with a first electrical load; and
responsive to the available capacity of the battery being less than a charge threshold:
charging the battery with the first electrical load while generating an increased boost pressure with an electric boosting device by powering the electric boosting device via the battery, and
coordinating an amount of the increased boost pressure to compensate the first electrical load.

2. The method of claim 1, further comprising:
responsive to the available capacity of the battery being greater than or equal to the charge threshold, charging the battery with the first electrical load without operating the electric boosting device.

3. The method of claim 1, further comprising:
determining one or more engine operating conditions, the one or more engine operating conditions comprising an exhaust gas temperature, an engine speed, and the engine load; and
determining whether the engine cold start is indicated by the one or more engine operating conditions.

4. The method of claim 1, further comprising:
estimating a charge to be provided to the battery by the first electrical load; and
determining the charge threshold based on the charge.

5. The method of claim 1, wherein powering the electric boosting device via the battery includes:
determining a second electrical load to be consumed by the electric boosting device based on the first electrical load, the available capacity of the battery, and an efficiency of converting the first electrical load to the second electrical load; and
powering the electric boosting device by consuming the second electrical load, the second electrical load being provided by the battery.

6. The method of claim 1, further comprising:
coordinating the amount of the increased boost pressure to adjust one or more of an engine air-fuel ratio and an engine torque.

7. A system for increasing an engine load of an engine, the system comprising:
an electric machine configured to operate as a generator for the engine;
a battery coupled to the electric machine, the battery configured to accept charge generated by the electric machine;
an electric boosting device coupled to the battery, the electric boosting device configured to draw charge from the battery;
a controller storing instructions in non-transitory memory, the instructions executable by a processor to, during a cold start of the engine:
determine an available capacity of the battery and a first charge to be generated by the electric machine; and
responsive to the available capacity of the battery being less than the first charge:
increase the engine load by a first amount by operating the electric machine, generate the first charge with the electric machine,
charge the battery with the first charge while the electric boosting device draws a second charge from the battery such that a boost pressure is generated by the electric boosting device, the second charge being less than the first charge, and
adjusting the boost pressure to compensate the first amount of the engine load.

8. The system of claim 7, wherein the instructions are executable to, responsive to the available capacity of the battery being greater than or equal to the first charge:
  increase the engine load by a second amount by operating the electric machine, the second amount greater than or equal to the first amount,
  generate the first charge with the electric machine, and charge the battery with the first charge.

9. The system of claim 7, wherein the first amount of the engine load is selected to increase an exhaust gas temperature by a predetermined amount.

10. The system of claim 7, wherein the instructions are executable to, responsive to the available capacity of the battery being less than the first charge:
  determine a desired electrical load to be consumed by the electric boosting device based on the first amount of the engine load, and
  determine the second charge based on the desired electrical load to be consumed by the electric boosting device.

11. The system of claim 10, wherein the instructions are executable to, responsive to the available capacity of the battery being less than the first charge:
  determine a maximum electrical load consumable by the electric boosting device, and
  determine whether the desired electrical load to be consumed by the electric boosting device is less than the maximum electrical load consumable by the electric boosting device.

12. The system of claim 11, wherein the instructions are executable to, responsive to the desired electrical load being less than or equal to the maximum electrical load, operate the electric boosting device such that the desired electrical load is consumed by the electric boosting device.

13. The system of claim 11, wherein the instructions are executable to, responsive to the desired electrical load being greater than the maximum electrical load, operate the electric boosting device such that the maximum electrical load is consumed by the electric boosting device.

14. The system of claim 7, wherein adjusting the boost pressure to compensate the first amount of the engine load includes altering an intake mass air flow.

15. A method for an engine cold start, the method comprising:
  operating an electric machine to increase an engine load such that a charge is generated by the electric machine;
  charging a battery with the generated charge while powering an electric boosting device via the battery such that a boost pressure is generated;
  determining a target boost pressure; and
  adjusting the generated boost pressure to match the target boost pressure.

16. The method of claim 15, wherein the generated boost pressure is greater than the target boost pressure, and adjusting the generated boost pressure to match the target boost pressure includes adjusting an intake throttle.

17. The method of claim 16, wherein adjusting the generated boost pressure to match the target boost pressure further includes:
  fully opening a bypass valve of a turbine of the electric boosting device; and
  increasing an aspect ratio of a variable nozzle turbine of the electric boosting device to a maximum aspect ratio.

18. The method of claim 15, wherein the generated boost pressure is less than the target boost pressure, and adjusting the generated boost pressure to match the target boost pressure includes:
  adjusting a bypass valve of a turbine of the electric boosting device; and
  adjusting an aspect ratio of a variable nozzle turbine of the electric boosting device.

19. The method of claim 18, wherein adjusting the generated boost pressure to match the target boost pressure further includes fully opening an intake throttle.

20. The method of claim 15, further comprising, responsive to the generated boost pressure being greater than the target boost pressure:
  determining a boost pressure difference based on the generated boost pressure and the target boost pressure; and
  retarding an ignition timing based on the boost pressure difference.

* * * * *